US011245341B2

(12) United States Patent
Ying et al.

(10) Patent No.: US 11,245,341 B2
(45) Date of Patent: Feb. 8, 2022

(54) CONTROL METHOD OF MULTILEVEL CONVERTER AND THE MULTILEVEL CONVERTER (71) Applicant: Delta Electronics (Shanghai) CO., LTD, Shanghai (CN)

(72) Inventors: Jianping Ying, Shanghai (CN); Wei Xie, Shanghai (CN); Lan Wei, Shanghai (CN); Jianfei Zheng, Shanghai (CN); Bingjie Liu, Shanghai (CN); Dingkun Shen, Shanghai (CN); Zhiming Hu, Shanghai (CN); Wei Xu, Shanghai (CN); Yang Liu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 206 days.

(21) Appl. No.: 16/802,829

(22) Filed: Feb. 27, 2020

(65) Prior Publication Data

US 2020/0280266 A1 Sep. 3, 2020

(30) Foreign Application Priority Data

Feb. 28, 2019 (CN) .......................... 201910150995.2

(51) Int. Cl.
*H02M 7/483* (2007.01)
*H02M 1/088* (2006.01)
*H02M 1/00* (2006.01)

(52) U.S. Cl.
CPC ........... *H02M 7/483* (2013.01); *H02M 1/088* (2013.01); *H02M 7/4835* (2021.05); *H02M 1/0003* (2021.05)

(58) Field of Classification Search
CPC .... H02M 7/483; H02M 1/088; H02M 7/4835; H02M 1/0003; H02M 1/32
See application file for complete search history.

(56) References Cited

U.S. PATENT DOCUMENTS 9,807,863 B1 * 10/2017 Van Zyl ................. H03F 3/2173
10,473,728 B2 * 11/2019 Goetz ..................... H02J 7/0024
(Continued)

FOREIGN PATENT DOCUMENTS

CN 101478242 A 7/2009
CN 101674073 A 3/2010
(Continued)

OTHER PUBLICATIONS

The IN1OA issued Nov. 27, 2020 by the IN Office.
The 1st Office Action dated Jan. 27, 2021 by the CNIPA.

*Primary Examiner* — Yusef A Ahmed
(74) *Attorney, Agent, or Firm* — Qinghong Xu (57) ABSTRACT A control method of a multilevel converter includes: classifying power modules that start working, need to update an output state or stop working to form m power module groups; and controlling power modules in a same one of the power module groups to start working, update the output state or stop working at the same time, and sequentially controlling the m power module groups to start working, or update the output state or stop working, according to a preset time interval. The number of power modules in each power module group is less than or equal to a preset value, causing a change value of an output level of the each power module group to be less than or equal to a preset voltage value.

18 Claims, 11 Drawing Sheets (56) References Cited

U.S. PATENT DOCUMENTS

| | | | | |
|---|---|---|---|---|
| 10,637,251 B2* | 4/2020 | Helling | ............... | H02J 3/387 |
| 10,848,104 B2* | 11/2020 | Gatard | ............... | H03F 1/32 |
| 10,910,824 B1* | 2/2021 | Jia | ............... | H02M 3/155 |
| 2013/0128635 A1* | 5/2013 | Korn | ............... | H02H 7/10 |
| | | | | 363/50 |
| 2014/0347898 A1* | 11/2014 | Raju | ............... | H02M 7/217 |
| | | | | 363/35 |
| 2014/0354234 A1* | 12/2014 | Sudan | ............... | H02J 13/00034 |
| | | | | 320/127 |
| 2014/0354248 A1* | 12/2014 | Son | ............... | H02M 7/49 |
| | | | | 323/234 |
| 2015/0095008 A1* | 4/2015 | Wang | ............... | G06F 12/0837 |
| | | | | 703/20 |
| 2016/0109493 A1* | 4/2016 | Cheng | ............... | H02J 3/00125 |
| | | | | 324/76.12 |
| 2017/0074168 A1* | 3/2017 | Chai | ............... | H02P 27/08 |
| 2017/0207719 A1* | 7/2017 | Dommaschk | ............... | H02M 7/483 |
| 2018/0331632 A1 | 11/2018 | Wang et al. | | |
| 2019/0296654 A1* | 9/2019 | Azidehak | ............... | H02M 7/483 |
| 2019/0341870 A1* | 11/2019 | Baurle | ............... | H02P 29/027 |
| 2020/0177099 A1* | 6/2020 | Slepchenkov | ............... | H02M 7/53871 |
| 2021/0165049 A1* | 6/2021 | Hong | ............... | H02M 1/32 |

FOREIGN PATENT DOCUMENTS

| | | |
|---|---|---|
| CN | 101478242 B | 9/2010 |
| CN | 102832801 A | 12/2012 |
| CN | 102832917 A | 12/2012 |
| CN | 104467378 A | 3/2015 |
| CN | 104617801 A | 5/2015 |
| CN | 104917406 A | 9/2015 |

* cited by examiner

CONTROL METHOD OF MULTILEVEL CONVERTER AND THE MULTILEVEL CONVERTER

CROSS REFERENCE

The present application claims priority to Chinese Patent Application No. 201910150995.2, filed on Feb. 28, 2019, the entire contents of which are hereby incorporated by reference.

TECHNICAL FIELD

The disclosure relates to the field of power supply technology, and in particular, to a control method of a multilevel converter and the multilevel converter applying the control method.

BACKGROUND

Figure 1A:
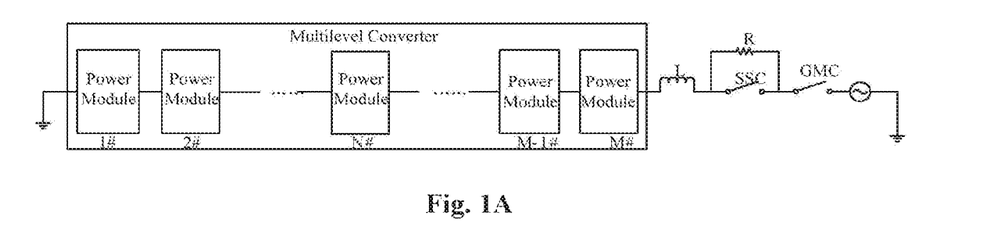
FIG. 1A is a schematic structural diagram of a multilevel converter.
Figure 1B:
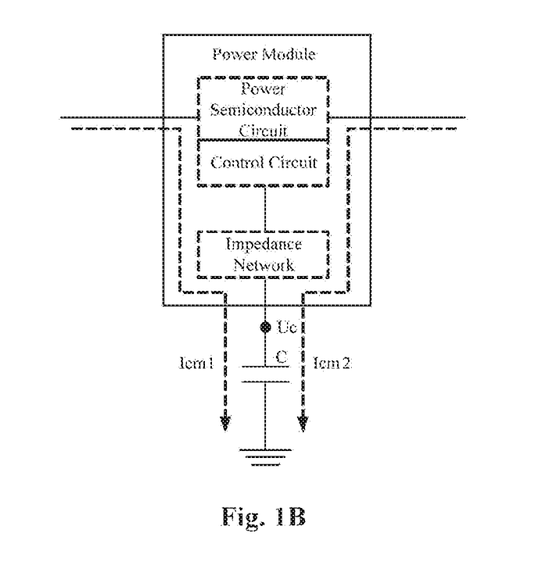
FIG. 1B is a schematic diagram illustrating the generation principle of power module interference.

FIG. 1A is a schematic diagram illustrating a converter with power modules in series. The converter can be MMC, cascaded H-bridge and the like. Referring to FIG. 1A and FIG. 1B, any power module has a common mode voltage Uc and a parasitic capacitance C to ground. When the common mode voltage Uc changes, the common mode current Icm1 and Icm2 flow through the parasitic capacitance C. The current will flow through the power semiconductor circuit or control circuit inside the power module, then pass through the impedance network to the housing, and then flow to the ground through the parasitic capacitance C. The impedance network may be a combination of passive components such as resistors and capacitors. The larger the common mode voltage Uc transitions, the larger the common mode current is, and the more serious the signal interference caused by the common mode current flowing through the control circuit is. As a result, the power semiconductor circuit or control circuit inside the power module may work abnormally, and the system may be shutdown.

In order to reduce the interference signal, the commonly used methods include adding hardware circuits inside the power module, bypassing the common mode current, shielding the sensitive circuits, or enhancing the ability of the sensitive circuits to resist common mode interference. These methods have the disadvantages of complicated circuit, increased cost, long debugging cycle, and non-significant effects.

It should be noted that the information disclosed in the background section above is only used to enhance the understanding of the background of the disclosure, and therefore may include information that does not constitute the prior art known to those of ordinary skill in the art.

SUMMARY

The disclosure is directed to provide a control method of a multilevel converter and the multilevel converter applying the control method.

According to a first aspect of the disclosure, there is provided a control method of a multilevel converter including n cascaded power modules and a processor coupled to the n power modules, the control method includes:

classifying power modules that start working, or need to update an output state, or stop working to form m power module groups, $n \geq m \geq 1$; and controlling power modules in a same one of the power module groups to start working at the same time, or update the output state at the same time, or stop working at the same time, and sequentially controlling, according to a preset time interval, the m power module groups to start working, or update the output state, or stop working;

wherein the number of power modules in each power module group is less than or equal to a preset value, causing a change value of an output level of the each power module group to be less than or equal to a preset voltage value.

According to a second aspect of the disclosure, there is provided a multilevel converter, including:

n cascaded power modules; and a processor coupled to the n power modules and configured to execute the control method according to any embodiment as described above.

It should be understood that the above general description and the following detailed description are merely exemplary and explanatory, and should not limit the disclosure.

BRIEF DESCRIPTION OF THE DRAWINGS

The accompanying drawings illustrate embodiments conforming to the disclosure and serve to explain the principles of the disclosure together with the description. Apparently, the accompanying drawings in the following description show merely some embodiments of the disclosure, and persons of ordinary skill in the art may still derive other drawings from these accompanying drawings without creative efforts.

DETAILED DESCRIPTION

Exemplary embodiments will be described more comprehensively by referring to accompanying drawings now. However, the exemplary embodiments can be embodied in many forms and should not be construed as limited to the embodiments set forth herein, rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the disclosure. Those skilled in the art will recognize, however, that the technical solution of the disclosure may be practiced without one or more of the specific details described, or that other methods, components, materials, etc. may be employed. In other instances, well-known technical solutions are not shown or described in detail to avoid obscuring aspects of the disclosure.

Furthermore, the accompanying drawings are merely schematic illustrations of the disclosure. Same or similar parts are denoted by same reference numbers in the drawings and, thus, a detailed description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

A detailed description of the exemplary embodiments of the disclosure will be made in the following with reference to the accompanying drawings.

Figure 2:
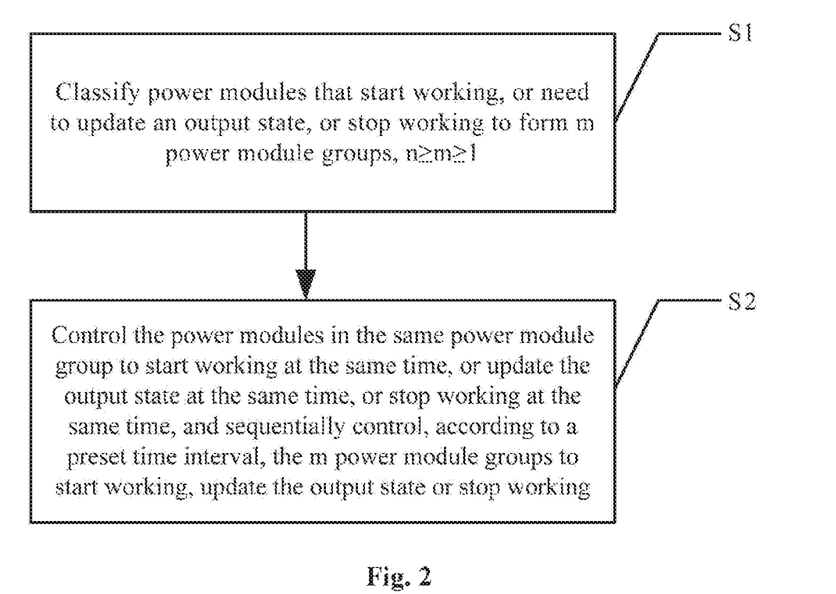
FIG. 2 is a flowchart illustrating a control method of a multilevel converter according to an exemplary embodiment of the disclosure.

FIG. 2 schematically illustrates a flowchart of a control method of a multilevel converter according to an exemplary embodiment of the disclosure. Referring to FIG. 2, a control method of a multilevel converter may include following steps.

In step S1, power modules that start working, or need to update an output state, or stop working are classified, to form m power module groups, n≥m≥1. In an embodiment, the power modules that start working, or need to update an output state, or stop working are determined based on a working state of the multilevel converter.

In step S2, the power modules in the same power module group are controlled to start working at the same time, or update the output state at the same time, or stop working at the same time, and the m power module groups are sequentially controlled to start working, update the output state or stop working, according to a preset time interval.

In an embodiment, the number of power modules in each of the power module groups is less than or equal to a preset value, causing a change value of an output level of the each power module group to be less than or equal to a preset voltage value.

According to the control method of the multilevel converter provided by embodiments of the disclosure, the power modules are classified based on the working state of the multilevel converter and the control signal is output to each group of power modules at a preset time interval, thereby reducing the output level change of the power modules and, consequently, effectively preventing the multilevel converter from working abnormally due to interfering signal caused by output level change of the power modules and, thus, improving reliability of the multilevel converter.

Referring to FIG. 1A and FIG. 1B, in order to reduce the common mode current, it may be necessary to reduce the change amplitude of the common mode voltage Uc corresponding to the power module. The change amplitude of the common mode voltage Uc of the N-th power module depends on a total change amplitude of the common mode voltage corresponding to the left (N−1) power modules and the right (M−N) power modules. If the output state of only one power module changes at a time, the change amplitude of the common mode voltage Uc is the smallest and the common mode interference is the smallest. Therefore, in the embodiments of the disclosure, through controlling the number of power modules whose output states change at the same time, the total change amplitude of the common mode voltage of multiple power modules is optimized to reduce common mode interference. The technical solution according to the embodiments of the disclosure may be applied to a low-frequency working state, and no hardware circuit is added. For example, the operating frequency of IGBT is 300-400 Hz.

The working states of the multilevel converter may include a starting state, a running state, a first off state, or a second off state.

The starting state of the multilevel converter refers to that the drive signals of all power modules are switched from a locked state to an enabled state. In the starting state, the output state of each power module may be firstly determined, the power modules may be classified according to the output states. For example, power modules with different output states are classified into different groups. And the number of power modules in each group may not exceed a preset value. The output states may include positive level, zero level, and negative level.

In some embodiments, n power modules are classified to form m power module groups, and the number of power modules in each group does not exceed the preset value, n≥m≥1.

Then, control signals are output, according to a preset time interval, to the power modules corresponding to each power module group, causing the power modules in the same group to enter the output state at the same time.

In an embodiment of the disclosure, the preset time interval is smaller than the switching period of each power module, and the time interval of the control signals for each power module group may be the same, that is, the preset time interval may include only one time interval T. In some other embodiments, the time interval of the control signals for each power module group may also be different, that is, the preset time interval may further include multiple time intervals T1 to Tm.

In an embodiment of the disclosure, when the working state of the multilevel converter is the starting state, the n power modules may be divided into 4 groups, for example, a power module group D1, a power module group D2, a power module group D3, and a power module group D4.

Then, the control signals corresponding to each power module group are sequentially output according to the preset time interval. Firstly, the control signal C1 is output to control the power modules in the power module group D1 to enter the output state at the same time. After the preset time interval T1, the control signal C2 is output to control the power modules in the power module group D2 to enter the output state at the same time. After the preset time interval T2, the control signal C3 is output to control the power modules in the power module group D3 to enter the output state at the same time. After the preset time interval T3, the control signal C4 is output to control the power modules in the power module group D4 to enter the output state at the same time. Among them, T1, T2, and T3 may be equal or unequal to each other. In some cases, it may also be set that T1=T2≠T3. The preset time interval between the control signals of each power module group may be set by those skilled in the art, which is not specifically limited in this disclosure.

After the starting state, the multilevel converter enters the running state. In the running state, the controller may determine the power module that needs to update the output state in response to the output state update signal.

Figure 3:
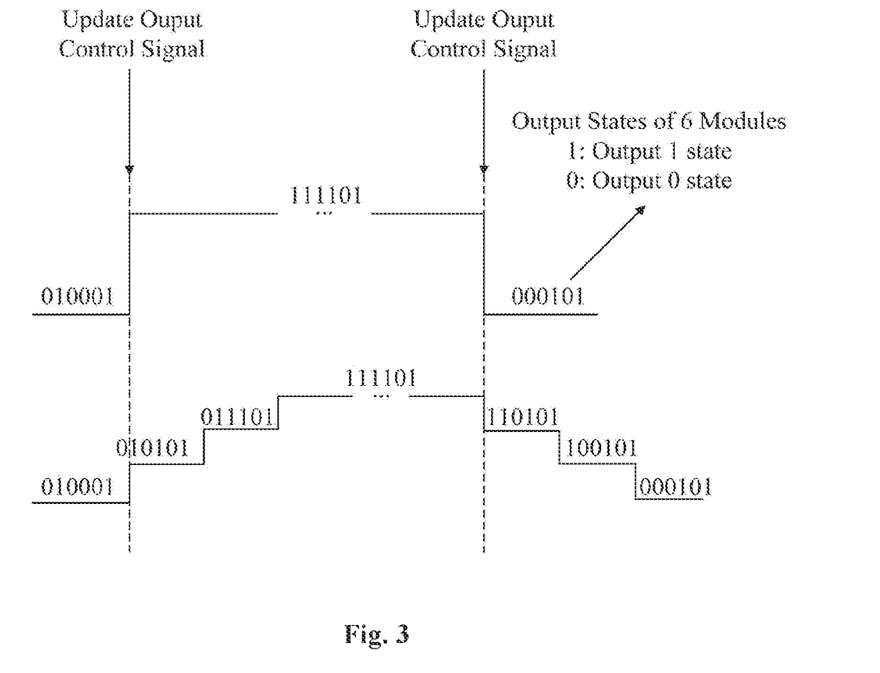
FIG. 3 is a schematic diagram of controlling a plurality of power modules to update the output state in a running state.

FIG. 3 is a schematic diagram of controlling a plurality of power modules to update the output state in a running state.

Referring to FIG. 3, during normal operation of the multilevel converter, if the output states of n power modules (n≥m) need to be updated, the n power modules may be grouped according to the output state control signal from the main controller. For example, the power modules that need to update the output state are divided into m groups. To update he output states of the power module means to change the output level of the power module, and the output level is to be switched among three levels including the zero level, the positive (1) level and the negative (−1) level. Then the output control signals corresponding to each power module group is output sequentially, controlling the power modules in the same power module group to update the output state at the same time. For example, m1 (m1<=m) power modules of the first group are firstly driven for switching state, then a control signal is output after the preset time interval to update the output state of m2 power modules in the second group. In this way, the output states of the n power modules are consistent with the output state control signals finally. In an embodiment, the time interval between the output state updates of two adjacent groups of power modules is inserted after the modulation control is completed, which is independent of modulation control method of the multilevel converter. The preset time interval may be much smaller than the switching period of the power modules, thereby preventing the insertion of the preset time interval from significantly affecting the control effect. However, the preset time intervals between the output state updates of any two adjacent power module groups may not be completely consistent.

As shown in FIG. 3, an example is taken that a multilevel converter includes 6 cascaded power modules, and the number of power modules in the power module group is equal to 1. The main controller outputs, based on the control and modulation algorithms, the output state control signals corresponding to the 6 power modules, thereby controlling each power module to update the output state. Specifically, if the current output state control signal is 111101 ("0" indicates that the module outputs 0 level and "1" indicates that the module outputs 1 level), and the previous output state control signal is 010001, it is determined that there are three power modules having the changed output state from 0 level to 1 level. In order to ensure that at most one power module is allowed to generate output level change, the output state of the third power module is updated first, that is, the output states of the 6 power modules are controlled to become 010101. After a preset time interval T1, the output state of the fourth power module is updated, that is, the output states of the 6 power modules are controlled to be updated as 011101. After a preset time interval T2, the output state of the sixth power module is updated, so that the output states of the 6 power modules are consistent with the current output state control signal 111101. Similarly, if the next output state control signal needs to be changed from 111101 to 000101, the output states of the power modules that need to update the output state may be updated one by one at a preset time interval until being consistent with the output control signal.

When the multilevel converter is normally shut down or requires shutdown operation after a fault, the working states of the multilevel converter may be divided into a first off state and a second off state. When the system is shut down normally or the system fault is a custom non-serious failure, the working state of the multilevel converter may be set to the first off state. When the system fault is a custom serious failure, the working state of the multilevel converter may be set to the second off state. When the working state of the multilevel converter is the first off state, the power modules that need to be stopped may also be grouped to form m power module groups, and the m power module groups may be controlled to stop working in sequence according to the preset time intervals, thereby reducing the change amplitude of the output level. The preset time interval between the blocking signals of two adjacent power module groups may be much smaller than the switching period of the power modules, and the preset time interval between the blocking signals of any two adjacent power module groups may not be completely consistent.

In an embodiment, the process of stopping each power module may be as follows. It is determined, in response to the first off signal, that the working state is the first off state; the power modules that need to be stopped are classified to form m power module groups; and the m power module groups are sequentially controlled to stop working, according to the preset time interval. In an embodiment, the first off signal includes a normal off signal when there is no fault and a first preset off signal, and the first preset off signal may be set as an off signal caused by a non-serious fault, such as a short-term overload of the system. In the embodiment of the disclosure, the processor determines, in response to the first off signal, the working state of the multilevel converter, and outputs blocking signals to control the power modules in each group to stop working.

Figure 4:
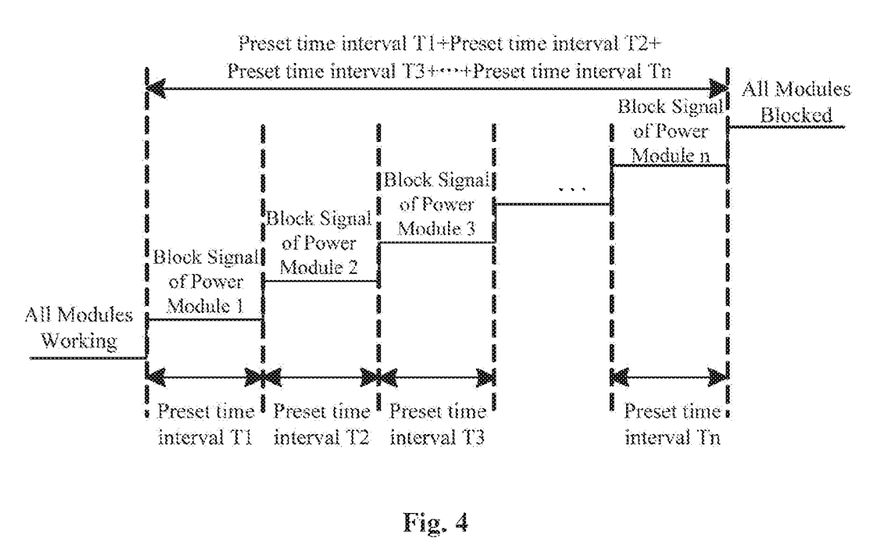
FIG. 4 is a schematic diagram of controlling each power module to stop working according to an embodiment.

FIG. 4 is a schematic diagram of controlling each power module to stop working according to an embodiment.

Referring to FIG. 4, as an example, the number of the power module in one group is equal to 1. When the working state of the multilevel converter is the first off state, the processor firstly outputs a block signal to control the first power module to stop working. After the preset time interval T1, a block signal is output to control the second power module to stop working. In this way, all power modules are controlled to stop working finally. In the embodiment of the disclosure, the control sequence for controlling the stop of each power module group is not limited. In this way, it is possible to avoid common mode interference caused by controlling all power modules to stop working at the same time, and increase the operation reliability of the multilevel converter.

Figure 5:
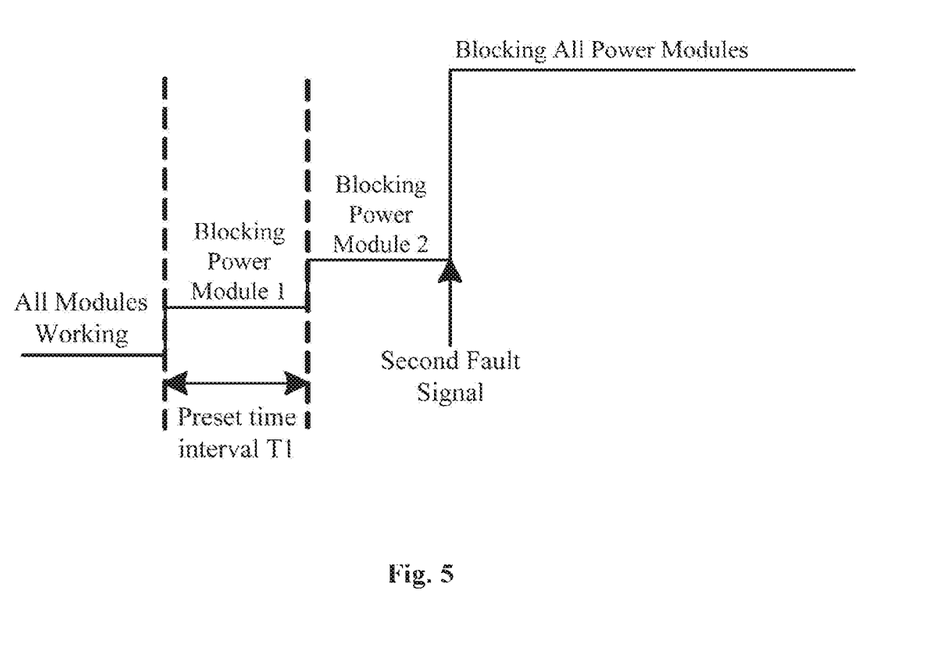
FIG. 5 is a schematic diagram of controlling each power module to stop working according to another embodiment of the disclosure.

FIG. 5 is a schematic diagram of controlling each power module to stop working according to another embodiment of the disclosure.

Referring to FIG. 5, in some embodiments, there is also a case where a major fault occurs and all power modules need to be controlled to stop working immediately, so as to prevent the accident from expanding. When the working state of the multilevel converter is in the above-mentioned first off state, each group of power modules may be sequentially controlled to stop working at the preset time interval. At this time, if the processor determines, in response to the second off signal, that the working state of the multilevel converter is the second off state, it controls all power modules that have not stopped working to stop working immediately. The second off signal may be set as an off signal caused by a major fault. In other embodiments, if the multilevel converter is in the running state, and the processor determines, in response to the second off signal, that the working state of the multilevel power converter is the second off state, it may control all n power modules to stop working immediately.

Figure 6A:
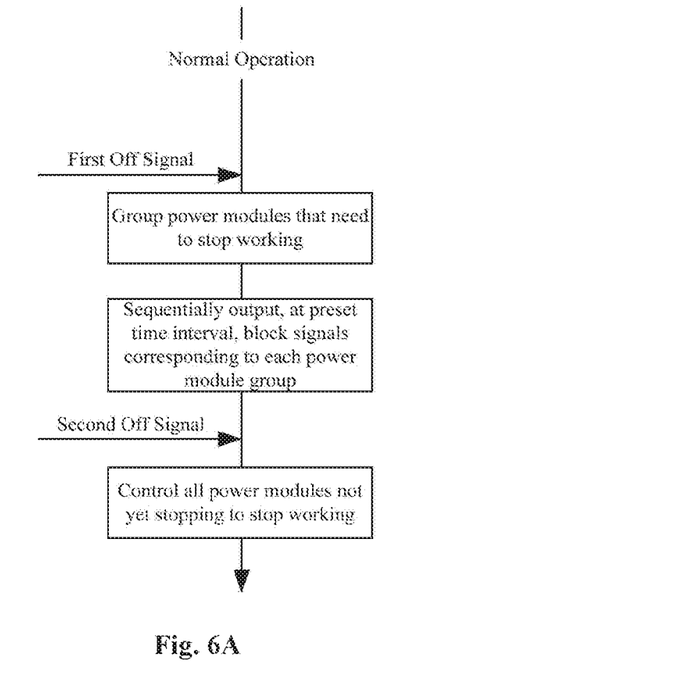
FIG. 6A is a schematic flowchart of the embodiment shown in FIG. 5.

FIG. 6A is a flowchart of the embodiment shown in FIG. 5. The multilevel converter is in normal operation. When the processor determines, in response to the first off signal, that the working state of the multilevel converter is the first off state, it groups the power modules that need to stop working, and sequentially outputs, according to a preset time interval, the blocking signals corresponding to each power module group, thereby controlling the corresponding power module group to stop working. At this time, when the processor determines, in response to the second off signal, that the working state of the multilevel converter is the second off state, it controls all power modules that have not stopped working to stop working immediately.

Figure 6B:
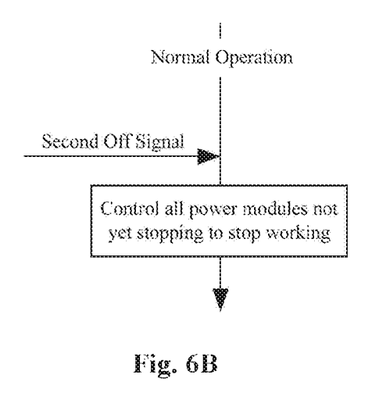
FIG. 6B is a schematic flowchart of controlling each power module to stop working according to still another embodiment.

FIG. 6B is a schematic flowchart of controlling each power module to stop working according to still another embodiment. The multilevel converter is in normal operation. When the processor determines, in response to the second off signal, that the working state of the multilevel converter is the second off state, it controls all power modules that have not stopped working to stop working immediately.

Figure 7A:
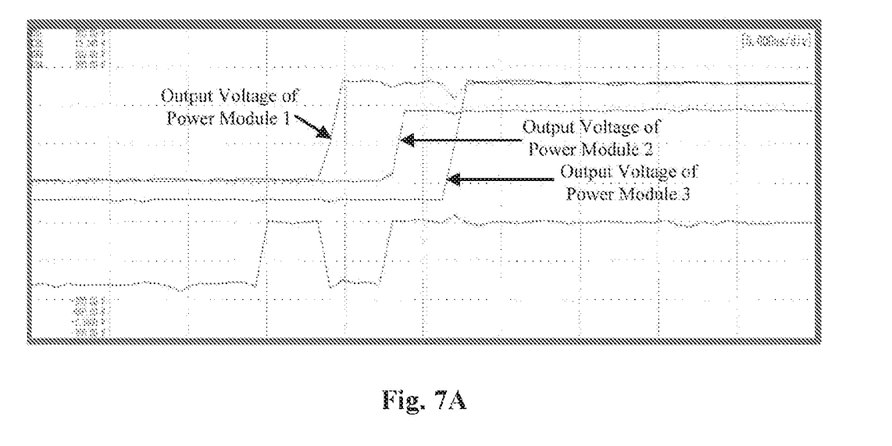
FIGS. 7A and 7B are schematic diagrams illustrating effects of the embodiment shown in FIG. 3.
Figure 7B:
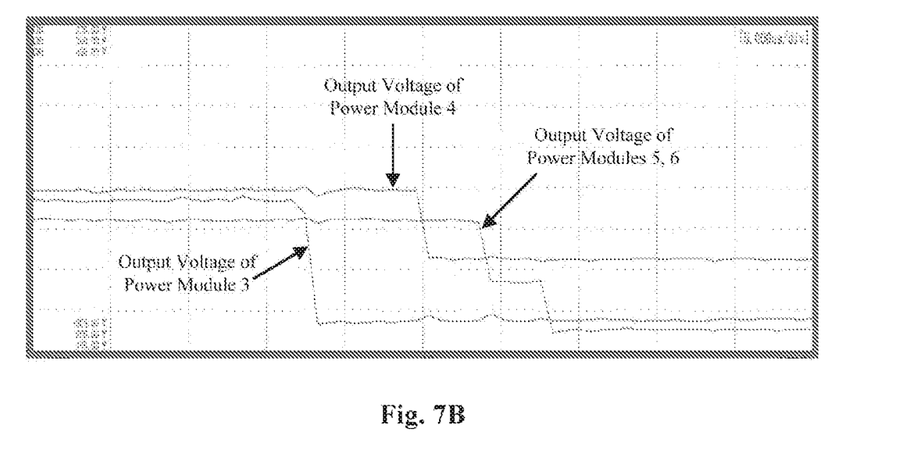

FIG. 7A and FIG. 7B are schematic diagrams illustrating effects of the embodiment shown in FIG. 3.

Referring to FIG. 7A and FIG. 7B, as an example, the multilevel converter includes 6 cascaded power modules, and the number of power modules in the group is equal to 1. The block signal is output step by step at the time when the output voltage passing zero, so as to facilitate directly observing the block signal of the power modules. Firstly, the first power module is controlled to stop working. Because a freewheeling current continues to flow through the diode inside the power module, the output level of the first power module changes from zero level to 1 level or −1 level. Taking the first power module as an example, if the freewheeling current flows into the first power module, the output level of the first power module is 1 level; if the freewheeling current flows out of the first power module, the output level of the first power module is −1. The processor outputs the blocking signals step by step to control the 6 power modules to stop working sequentially, thereby reducing the output level change caused by stop working of the power modules. If the 6 modules are controlled to stop working at the same time, the output level change of a single power module becomes 6 times the bus voltage, and if each power module is controlled to stop working in turn, for a single power module, its output level change is only 1 times the bus voltage. Therefore, sequentially controlling each power module to stop working can greatly reduce the common mode current, thereby reducing the interference of the common mode current to the internal processor of the power module. It can be known from FIG. 7A and FIG. 7B that, through grouping the power modules and sequentially outputting the blocking signals corresponding to each power module group at the preset time interval, the change amplitude of the output levels of the power modules at the same time can be reduced.

According to the embodiments of the disclosure, the number of the power modules changing its output level at the same time is less than a set value, so the level change amplitude of the multilevel converter at the same time is reduced, and the common mode current is reduced, thereby reducing the impact of common mode interference.

Based on the above method embodiments, the disclosure also provides a multilevel converter, which can be used to execute the above method embodiments.

Figure 8:
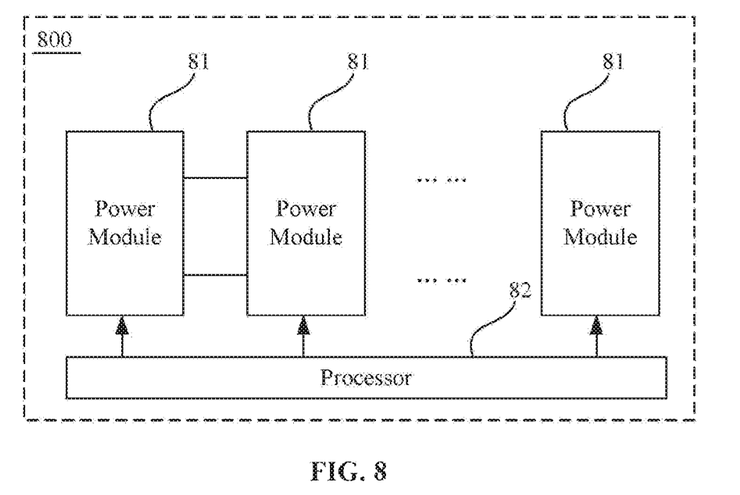
FIG. 8 is a block diagram of a multilevel converter according to an embodiment of the disclosure.

FIG. 8 schematically illustrates a block diagram of a multilevel converter in an exemplary embodiment of the disclosure.

Referring to FIG. 8, the multilevel converter may include:
n cascaded power modules 81; and
a processor 82 coupled to the n power modules 81 and configured to execute the control method described above.

Since the functions of the device 800 have been described in detail in the corresponding method embodiments, they are not repeated herein.

It should be noted that although several modules or units of the device for action execution are mentioned in the detailed description above, this division is not mandatory. In fact, according to the embodiments of the disclosure, the features and functions of two or more modules or units described above may be embodied in one module or unit. Conversely, the features and functions of a module or unit described above can be further divided into multiple modules or units to be embodied.

Those skilled in the art can understand that various aspects of the present invention can be implemented as a system, a method or a program product. Therefore, various aspects of the present invention can be embodied in the following forms: a complete hardware implementation, a complete software implementation (including firmware, microcode and the like), or a combination of hardware and software implementations, which can be collectively referred to herein as "circuit", "module", or "system".

In addition, the above-mentioned drawings are merely a schematic description of processes included in a method according to an exemplary embodiment of the present invention, and are not limiting purposes. It is easy to understand that the processes shown in the above drawings do not indicate or limit the chronological order of these processes. In addition, it is also easy to understand that these processes may be, for example, performed synchronously or asynchronously in multiple modules.

Other embodiments of the disclosure will be apparent to those skilled in the art from consideration of the specification and practice of the invention disclosed here. This application is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the claims.

What is claimed is:

1. A control method of a multilevel converter, the multilevel converter comprising n cascaded power modules and a processor coupled to the n cascaded power modules, and the control method comprising:
    classifying at least two of the n cascaded power modules that start working, or need to update an output state, or stop working to form m power module groups, where n and m are integers and n>m>1; and
    controlling every cascaded power module in a same one of them power module groups to start working, or update the output state, or stop working at the same time, and sequentially controlling the m power module groups to start working, or update the output state, or stop working, according to a preset time interval;
    wherein the number of the at least two cascaded power modules in each of the m power module groups is less than or equal to a preset value, causing a change value of an output level of each of the m power module groups to be less than or equal to a preset voltage value,
    wherein the output state comprises a zero level, a positive level, or a negative level, and
    wherein the at least two of the n cascaded power modules that start working, or need to update an output state, or stop working are determined based on a working state of the multilevel converter, and the working state comprises a starting state, a running state, a first off state, or a second off state.

2. The control method according to claim 1, further comprising:
determining that the working state is the first off state in response to a first off signal;
classifying the at least two of the n cascaded power modules that need to stop working to form the m power module groups; and
sequentially controlling, according to the preset time interval, the m power module groups to stop working.

3. The control method according to claim 2, further comprising:
determining that the working state is the second off state in response to a second off signal; and
controlling every cascaded power module that has not stopped working to stop working immediately.

4. The control method according to claim 1, further comprising:
determining that the working state is the second off state in response to a second off signal; and
controlling the n cascaded power modules to stop working immediately.

5. The control method according to claim 1, further comprising:
classifying, when the working state is the starting state, the at least two of the n cascaded power modules to form the m power module groups; and
sequentially outputting, according to the preset time interval, control signals corresponding to each of the m power module groups, controlling every cascaded power module in a same one of the m power module groups to simultaneously enter the output state.

6. The control method according to claim 1, further comprising:
comparing a current output state control signal with a previous output state control signal, when the working state is the running state;
classifying the at least two of the n cascaded power modules that need to update the output state to form the m power module groups; and
controlling every cascaded power module in a same one of the m power module groups to simultaneously update the output state, and sequentially controlling, according to the preset time interval, the m power module groups to update the output state.

7. The control method according to claim 1, wherein the preset time interval is shorter than a switching period of a respective one of the n cascaded power modules.

8. The control method according to claim 1, wherein the number of the at least two cascaded power modules in each of the m power module groups is the same.

9. The control method according to claim 1, wherein the number of the at least two cascaded power modules in each of the m power module groups is different.

10. A multilevel converter, comprising:
n cascaded power modules; and
a processor coupled to the n cascaded power modules and configured to:
classify at least two of the n cascaded power modules that start working, or need to update an output state or stop working to form m power module groups, where n and m are integers and n>m>1; and
control every cascaded power module in a same one of the m power module groups to start working, or update the output state, or stop working at the same time, and sequentially control the m power module groups to start working, or update the output state, or stop working, according to a preset time interval;
wherein the number of the at least two cascaded power modules in each of the m power module groups is less than or equal to a preset value, causing a change value of an output level of each of the m power module groups to be less than or equal to a preset voltage value,
wherein the output state comprises a zero level, a positive level, or a negative level, and
wherein the at least two of the n cascaded power modules that start working, or need to update an output state, or stop working are determined based on a working state of the multilevel converter, and the working state comprises a starting state, a running state, a first off state, or a second off state.

11. The multilevel converter according to claim 10, wherein the processor is configured to:
determine that the working state is the first off state in response to a first off signal;
classify the at least two of the n cascaded power modules that need to stop working to form the m power module groups; and
sequentially control, according to the preset time interval, the m power module groups to stop working.

12. The multilevel converter according to claim 11, wherein the processor is configured to:
determine that the working state is the second off state in response to a second off signal; and
control every cascaded power module that has not stopped working to stop working immediately.

13. The multilevel converter according to claim 10, wherein the processor is configured to:
determine that the working state is the second off state in response to a second off signal; and
control the n cascaded power modules to stop working immediately.

14. The multilevel converter according to claim 10, wherein the processor is configured to:
classify, when the working state is the starting state, the at least two of the n cascaded power modules to form the m power module groups; and
sequentially output, according to the preset time interval, control signals corresponding to each of the m power module groups, controlling every cascaded power module in a same one of the m power module groups to enter the output state at the same time.

15. The multilevel converter according to claim 10, wherein the processor is configured to:
compare a current output state control signal with a previous output state control signal, when the working state is the running state;
classify the at least two of the n cascaded power modules that need to update the output state to form the m power module groups; and
control every cascaded module in a same one of the m power module groups to update the output state at the same time, and sequentially control, according to the preset time interval, the m power module groups to update the output state.

16. The multilevel converter according to claim 10, wherein the preset time interval is shorter than a switching period of a respective one of the n cascaded power modules.

17. The multilevel converter according to claim 10, wherein the number of the at least two cascaded power modules in each of the m power module groups is the same.

18. The multilevel converter according to claim 10, wherein the number of the at least two cascaded power modules in each of the m power module groups is different.

\* \* \* \* \*